United States Patent
Wadey et al.

[19]

[11] Patent Number: 6,158,690
[45] Date of Patent: Dec. 12, 2000

[54] CABIN INTERIOR PANEL SYSTEM FOR REDUCING NOISE TRANSMISSION IN AN AIRCRAFT

[75] Inventors: Bryan T. Wadey, Woodbridge; Charles A. Yoerkie, Jr., Newington, both of Conn.

[73] Assignee: Sikorsky Aircraft Corporation, Stratford, Conn.

[21] Appl. No.: 09/183,256

[22] Filed: Oct. 30, 1998

[51] Int. Cl.$^7$ .................................................. B64C 1/00
[52] U.S. Cl. .................... 244/17.27; 244/119; 244/117 R
[58] Field of Search .............................. 244/17.27, 17.11, 244/117 R, 119, 129.1; 267/140.11, 136; 188/379, 380; 248/550–559

[56] References Cited

U.S. PATENT DOCUMENTS

| | | | |
|---|---|---|---|
| 2,859,841 | 11/1958 | Reed, Jr. et al. | 244/119 |
| 2,925,050 | 2/1960 | Candlin, Jr. et al. | 244/119 |
| 5,201,831 | 4/1993 | Higgins et al. | 244/119 |
| 5,222,694 | 6/1993 | Smoot | 244/119 |
| 5,310,137 | 5/1994 | Yoerkie, Jr. et al. | 244/17.27 |
| 5,324,563 | 6/1994 | Rogers et al. | 244/119 |
| 5,843,558 | 12/1998 | Yoshizaki et al. | 244/119 |
| 5,845,236 | 12/1998 | Jolly et al. | 267/140.11 |
| 5,904,318 | 5/1999 | Towfig | 244/119 |
| 5,984,233 | 11/1999 | Snyder, Jr. et al. | 244/119 |

OTHER PUBLICATIONS

Custom Aircraft Completions, Inc., Illustrated Parts Catalogue, "Sikorsky S76 Sound Reduction Wall Panel System", Sep. 1, 1992.

*Primary Examiner*—Galen L. Barefoot
*Attorney, Agent, or Firm*—Seidel, Gonda, Lavorgna & Monaco, PC

[57] ABSTRACT

A cabin interior assembly for an aircraft is disclosed, the aircraft having a primary airframe structure for supporting vibrating components. The cabin interior assembly includes a shell structure located within the airframe structure. The shell structure is formed from a plurality of axially spaced bell frames. Each bell frame is unitary and extends from one side of the cabin interior, across the ceiling and down to the other side. At least two longitudinal support members are attached to and extend between each adjacent pair of the bell frames. A plurality of panels are mounted to the shell structure with the edges of adjacent panels forming a butt joint as they overlap the bell frames and longitudinal support members. Isolators are disposed between the shell structure and the airframe structure. Each isolator includes a first component mounted to a lower end of a bell frame and a second component mounted on the airframe structure. The isolator is operative for attaching the shell structure to the airframe structure and for reducing vibratory transmission from the airframe structure to the cabin interior trim panel shell structure.

33 Claims, 8 Drawing Sheets

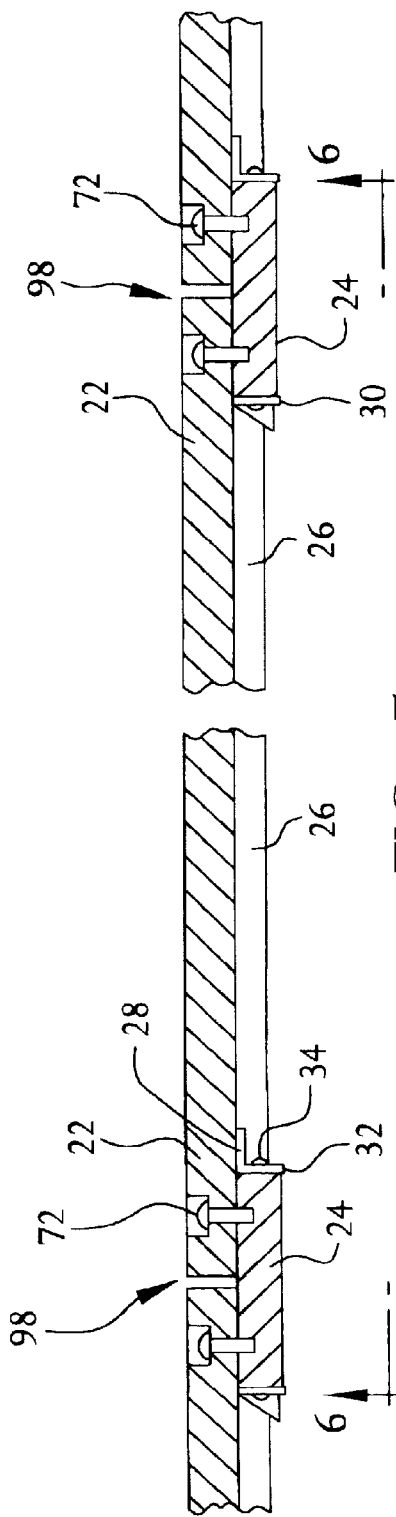
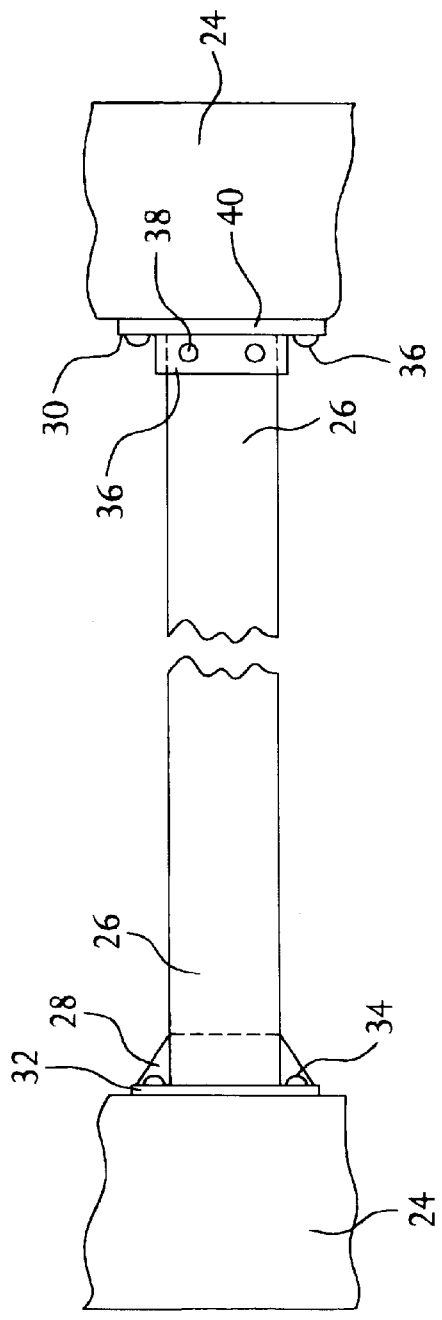

CABIN INTERIOR PANEL SYSTEM FOR REDUCING NOISE TRANSMISSION IN AN AIRCRAFT

FIELD OF THE INVENTION

The present invention relates to an interior structure for an aircraft cabin and, more particularly, to a shell/frame and panel structure which reduces noise transmission into an aircraft cabin interior.

BACKGROUND OF THE INVENTION

One of the major passenger complaints with aircraft travel is noise within the cabin section. Noise develops in an aircraft cabin from several sources. The most common sources are internally or externally mounted moving components, such as a transmission, engine or rotor system. Another source of cabin noise is air flows over various aircraft fuselage components, such as engines, landing gear, and cowlings. These components generate vibrations in the aircraft that propagate through the airframe and into the cabin.

Noise is a particular problem in helicopter cabins since the rotor and transmission systems produce a significant amount of vibration in the airframe structure. These vibrations travel through the airframe structure and into the cabin interior resulting in vibratory noise. It is not uncommon for noise levels within all uninsulated aircraft to reach upwards of 110 decibels or more, which can be very annoying and even harmful to the occupants.

Aircraft cabin interiors are generally designed to keep aircraft interior noise below a certain predetermined level. For example, the civilian S-92C aircraft currently being developed by Sikorsky Aircraft Corporation has a design average noise level limit with the environmental control system (fans, vent air and cooling/heating system) turned off of 80 dB SIL4, with no single seat location exceeding 85 dB SIL4. With the environmental control system turned on, the average noise limit is 81 dB SIL4, with no single seat location exceeding 89 dB SIL4. The SIL4 (Speech Interference Level 4) noise measurement metric is the arithmetic average of the sound pressure levels in the 500, 1000, 2000 and 4000 Hz octave bands. It rates steady noise according to it's ability to interfere with conversation between two people. The SIL4 noise measurement metric was developed by an engineer in the U.S. Navy in the 1950's and has been adopted as an ANSI (American National Standards Institute) standard.

There have been significant advances made over the last several years in an effort to reduce noise in cabin structures. One solution has been to incorporate absorptive materials on interior panels to reduce noise reverberation in the cabin. Another method for reducing the transmission of vibration into the cabin interior is by mounting damping elements (absorbers) between the airframe and the cabin interior mounting points. These damping elements include a vibration absorbing component, such as rubber, which attenuates the vibrations being transmitted from the airframe to the cabin interior panels.

Recently. an aggressive noise reduction technique has been developed by the assignee of the present invention wherein noise vibrations are actively reduced by the transmission of counter vibrations. The transmitted counter-vibrations are at substantially the same frequency as the vibratory noise but opposite in phase so as to effectively cancel out the vibratory noise. This active noise control system is disclosed in U.S. Pat. No. 5,310,137, which is incorporated herein by reference in its entirety.

Conventional cabin interiors include a plurality of panels mounted directly to the aircraft airframe. As noted above, in order to reduce the transmission of vibration from the airframe to the cabin interior, damping elements, such as rubber absorbers, are sometimes mounted to the panels at the point where the panels attach to the airframe. Since the panels in these conventional designs arc attached directly to the aircraft airframe, a considerable amount of damping elements are needed. For example, in Sikorsky Aircraft Corporation's S-76® aircraft (S-76® is a registered trademark of Sikorsky Aircraft Corporation), the panels are mounted directly to the airframe through upwards of approximately 40 separate attachment points. On one frame alone there may be upwards of 6 attachment points. Each of these attachment points requires the installation of a discreet absorber to dampen transmission of vibration from the airframe into the panel. Installation of these numerous absorbers is time consuming and costly, as well as being a maintenance item. By directly mounting to the airframe structure at many location having relatively high noise energy, the full acoustic property potential of the panel system is not achieved by conventional systems.

To further minimize noise transmission into the cabin interior, the panels in a conventional aircraft interior typically interlock with one another. That is, the panels are designed such that the edges of adjacent panels overlap one another to form a lap joint. While lap joints are very good at preventing noise from passing between two panels, these joints make removal of an individual panel very difficult. Since the panels are all interlocked, multiple panels typically must be removed in order to gain access to a space behind a particular panel or to remove a single damaged panel. This results in a considerable amount of wasted time during a routine maintenance procedure.

Another problem with conventional interior systems is that, since the panels are designed to mount directly on the airframe, each panel must be custom designed to fit into a particular location. As such, there is no commonality between panels or, for that matter, between aircraft since the airframe in each aircraft differs to some extent due to manufacturing tolerances. Accordingly, when a panel is damaged, there is no "off the shelf" panel that can be easily installed in the aircraft. Instead, the panel must be cut to fit into the particular airframe structure. Also, conventional panels are typically attached to the airframe with fine threaded machine screw type fasteners which take considerable time to install and remove, as well as being prone to damaged screw threads. As a result, it takes two maintenance personnel an entire shift to completely remove a conventional interior structure from an S-76® aircraft. Reinstallation of the interior takes two men approximately two shifts. This leads to an excessive amount of aircraft downtime when interior maintenance is needed.

Another problem with conventional interior systems is that the interior panels themselves, since they are mounted directly to the airframe structure, must be very stiff in order to prevent their deformation and collapse in the event of high level in-flight vibration or a hard landing. This necessitates that the panels be designed with high structural load carrying capability. As such, the panels are typically complex heavy structures which are expensive to manufacture.

Another problem with conventional helicopter interiors is that some are built as a stand alone structures which mount to the cabin floor independent of all airframe structure except the floor. They are built essentially as a monocoque structure with very stiff interlocking panels and no supporting frame members. This arrangement, while well isolated from airframe vibration, presents a totally interlocking panel set which must be totally removed to detach any individual panel. This configuration also requires substantial maintenance time. It is not uncommon for this type of configuration to take two men a full day to remove.

A need therefore exists for an improved cabin interior structure which is designed to reduce noise and is easy to assemble and disassemble.

SUMMARY OF THE INVENTION

One object of the present invention is to provide an improved cabin interior which allows individual panels to be easily removed.

Another object of the present invention is to provide an improved cabin interior which minimizes the transmittance of vibratory noise into the cabin.

Another object of the present invention is to provide an independent support structure for the cabin interior panels allowing the panels themselves to be designed with significantly less stiffness, weight and cost.

A further object of the present invention is to provide a mounting or attaching shell/frame structure which more nearly allows for the full acoustic properties of the acoustic panels to be realized in the cabin installation.

These and other objects and advantages are provided by the cabin interior assembly according to the present invention. The cabin interior assembly is designed to be mounted within the primary airframe structure of an aircraft. The cabin interior assembly includes a shell structure located within the airframe structure. A plurality of interior panels are mounted to the shell structure to form a substantially enclosed cabin.

The shell structure is formed from a plurality of axially spaced bell type frames. Each bell frame is unitary and extends from one side of the cabin interior, across the ceiling and down to the other side, defining an inverted substantially U-shaped structure. To provide high strength at low weight the bell frames are preferably made from lightweight material, such as graphite, kevlar, or fiberglass material in a resin matrix with a structural foam or honeycomb core.

At least two longitudinal support members are attached to and extend between each adjacent pair of bell frames. Preferably there are at least four longitudinal support members between each set of adjacent frames, a longitudinal support member located near each lower end of the bell frames and a longitudinal support member located at each upper corner of the bell frame.

The panels are preferably mounted to the bell frames and the longitudinal support members such that the edges of adjacent panels form a butt joint while overlapping the bell frame and longitudinal support members. The panels are preferably attached using quarter-turn or similar quick-release fasteners.

Isolators are disposed between the shell structure and the airframe structure. Each isolator includes a first component mounted to a lower end of a bell frame and a second component mounted on the airframe structure. The isolator is operative for attaching the shell structure to the airframe structure and for reducing vibratory transmissions from the airframe to the shell structure.

In one embodiment of the invention, the first component includes a cuff mounted to the bell frame. The cuff defines an inner cavity within which a mounting cylinder is located. The mounting member is attached to the second component. An elastomeric member is disposed between the mounting member and the cuff. The cuff and the elastomeric member preferably have annular shapes, and are substantially concentric with the mounting member.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 5 is a section view taken along lines 5—5 in FIG. 1 illustrating a preferred attachment of a panel and longitudinal support member to the bell frames.

FIG. 6 is a side view taken along lines 6—6 in FIG. 5 illustrating the longitudinal support member attachment to the bell frames.

DESCRIPTION OF THE PREFERRED EMBODIMENTS

Figure 1:
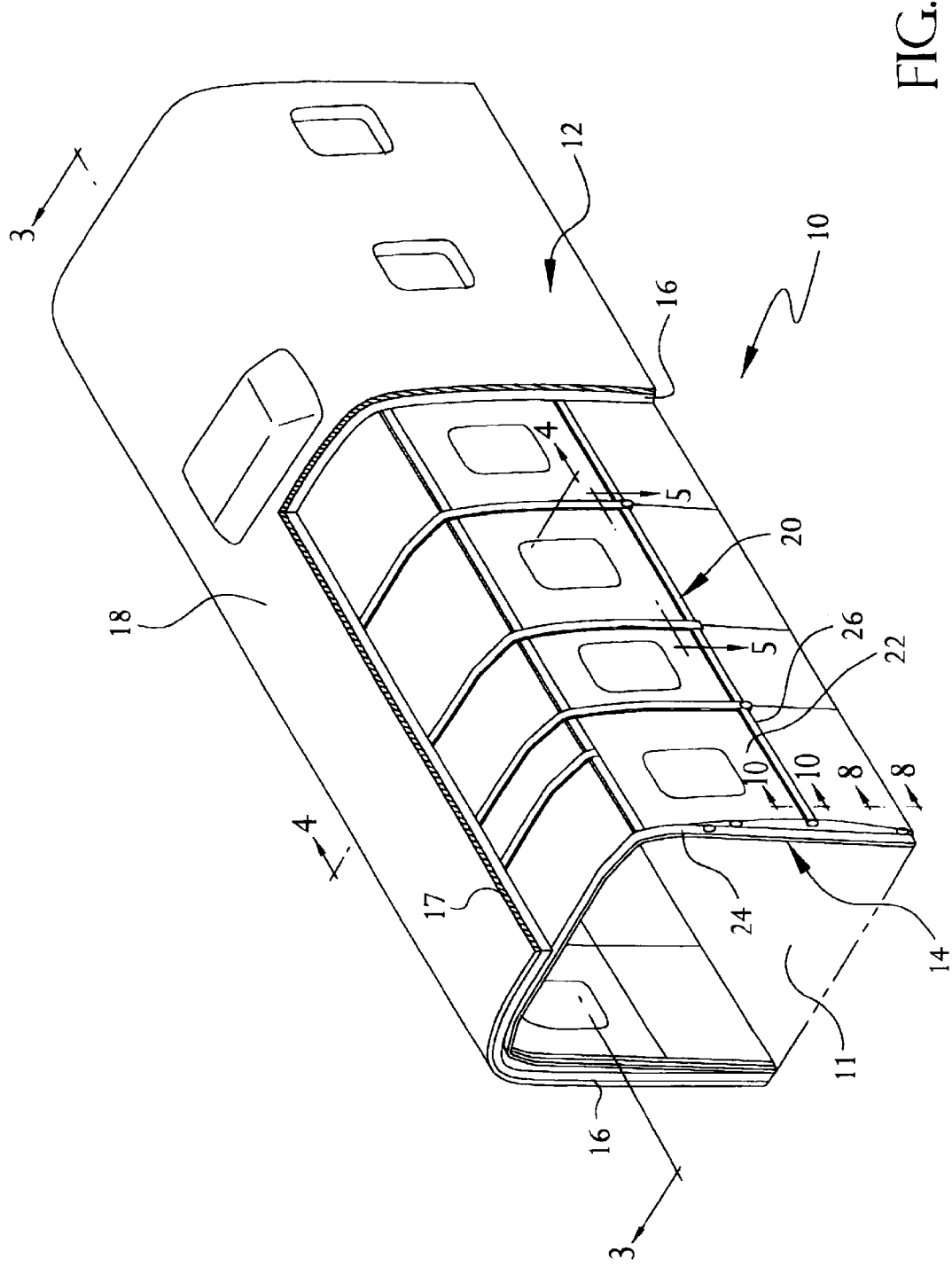
FIG. 1 is a partial section view of a cabin portion of an aircraft illustrating the present invention.

Referring now to the drawings, wherein like reference numerals illustrate corresponding or similar elements throughout the several views, FIG. 1 illustrates a cabin portion 10 of a helicopter. The cabin portion 10 includes a main airframe structure 12 and a cabin interior assembly 14. The airframe structure 12 includes a series of spaced apart frames 16 which are interconnected by beams 17. A skin 18 is attached to the frames 16 and beams 17 to form the main airframe structure 12 of the aircraft. Although the figures and the following discussion describe the present invention as it applies to a cabin portion of a helicopter, it is contemplated that the present invention can also be utilized on a cabin portion of any aircraft (e.g., fixed wing). Aircraft structural airframes are well known in the art and, therefore, details of the aircraft airframe are not necessary for a complete understanding of the present invention except as described below.

Figure 2:
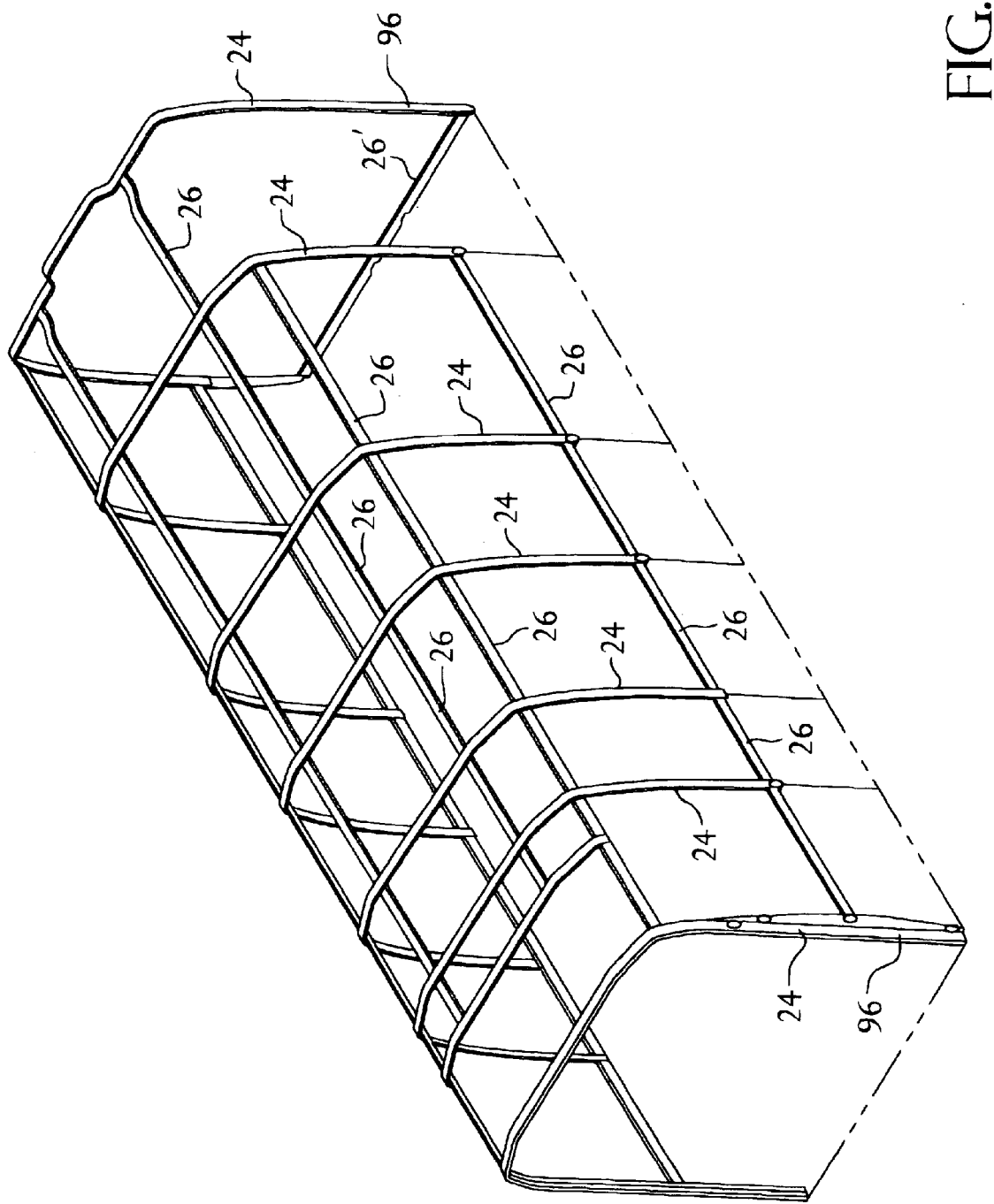
FIG. 2 is an isometric view of a shell structure according to the present invention.

The cabin interior assembly 14 is mounted internally from the main airframe structure 12. The cabin interior assembly 14 includes a shell structure 20 and a plurality of panels 22. Referring to FIG. 2, the shell structure 20 includes a plurality of partial hoop or bell frames 24 interconnected by longitudinal support members 26. The bell frames 24 preferably extend from a side or near a bottom of the cabin interior assembly 14, across the cabin ceiling and back down to the opposite side and/or near the floor to form an inverted substantially U-shaped frame. In the preferred embodiment, the bell frames 24 are made from high strength lightweight material, such as graphite, KEVLAR, or fiberglass material in a resin matrix with a structural foam or honeycomb core or and aluminum tube. (KEVLAR is a trademark of E. I. du Pont De Nemours and Company for synthetic aramid fibers.) The bell frames 24 have a molded thickness of approximately ¾ inches and a width of about 2 inches. In one embodiment, the bell frames 24 include a Rohacell foam core that is about 0.62 inches thick. A carbon fiber ply with a thickness of 0.0075 inches is wrapped around the core. Three carbon fiber tape layers (0.006 inches thick) are disposed on the top and bottom of the laminate, followed by a second carbon fiber ply (0.0075 inches thick) wrapped around the entire laminate.

As shown in FIG. 2, there are preferably a plurality of bell frames 24 spaced throughout the cabin interior assembly 14. The bell frames 24 are preferably substantially the same in shape throughout the cabin interior structure 14, thus, allowing for interchangeability between bell frames 24 at any frame location on an aircraft which has a substantially constant cabin geometry. If the aircraft cabin geometry is not constant, then it may be desirable to vary the shape and design of the bell frames 24. As shown in the figures, each bell frame 24 is preferably formed as an integral or unitary structure along its entire length. thus reducing the number of components that must be attached when forming the aircraft interior 14. Also, the elimination of interconnecting joints in the bell frame 24 results in a stronger frame.

As discussed above, the bell frames 24 are spaced apart by longitudinal support members 26. The longitudinal support members 26 provide the shell structure 20 with both longitudinal rigidity, to prevent forward and aft racking of the interior 14 during flight maneuvers and hard landings, and a panel independent surface for acoustical sealing of the panel system along longitudinal panel sides. In the illustrated embodiment, there are at least two and, more preferably, at least four longitudinal support members 26 affixed between adjacent bell frames 24. The longitudinal members 26 are preferably spaced about the circumference of the bell frames 24 at prescribed locations. As will be discussed in more detail below, the exact location of the longitudinal support frames 26 coincides with the mounting locations for the panels 22. In the illustrated embodiment, the longitudinal support members 26 are located at the ends, the upper corners, and along the ceiling of the bell frames 24 for much of the cabin interior assembly 14.

The longitudinal support members 26 are preferably made from a sandwich structure with a honeycomb core laminated between fiberglass skins. In one embodiment of the invention, the longitudinal support members 26 are made from a honeycomb core with one on top and bottom of 90° fiberglass tape (0.006 inch thick) following by one ply on top and bottom of 0° fiberglass tape (0.006 inch thick). The longitudinal support member has a thickness of about ⅜ inch and a width of about 2 inches. When the longitudinal support member 26 is attached between the bell frames 24, the shell structure 20 functions as a rigid space frame within the aircraft for supporting the cabin interior panels 22.

Referring to FIG. 2, there is also a lateral support member 26' which ties together the lower ends of the forward most cabin bell frame 24. This provides added stiffness to the forward most bell frame assembly thereby allowing for a good fit of the forward cabin bulkhead which may include a door or curtain separating the cabin from the cockpit.

For ease of assembly and interchangeability it is desirable for the bell frames 24 to be spaced substantially the same distance apart throughout the cabin. This allows the longitudinal support members 26 to be fabricated with the same length. However, aircraft airframe constraints will typically require some differences in spacing between bell frames 24, necessitating the use of longitudinal support members 26 having different lengths. It is, however, preferred that the circumferential spacing between adjacent bell frames 24 be the same to allow circumferential interchangeability of the longitudinal support members 26.

In order to minimize weight, many of the bell frames 24 terminate prior to reaching the cabin floor 11. However, it is contemplated that some bell frames 24 may need to be formed longer than others as shown, typically at the forward and aft end of the cabin. In these cases, the bell frame 24 can either be formed with longer side portions, or can have frame extensions 96 attached to the lower end of the bell frame 24 via a bracket (not shown). The frame extensions 96 can be made from any suitable material, typically similar to the bell frames 24 or longitudinal support members 26.

Figure 3:
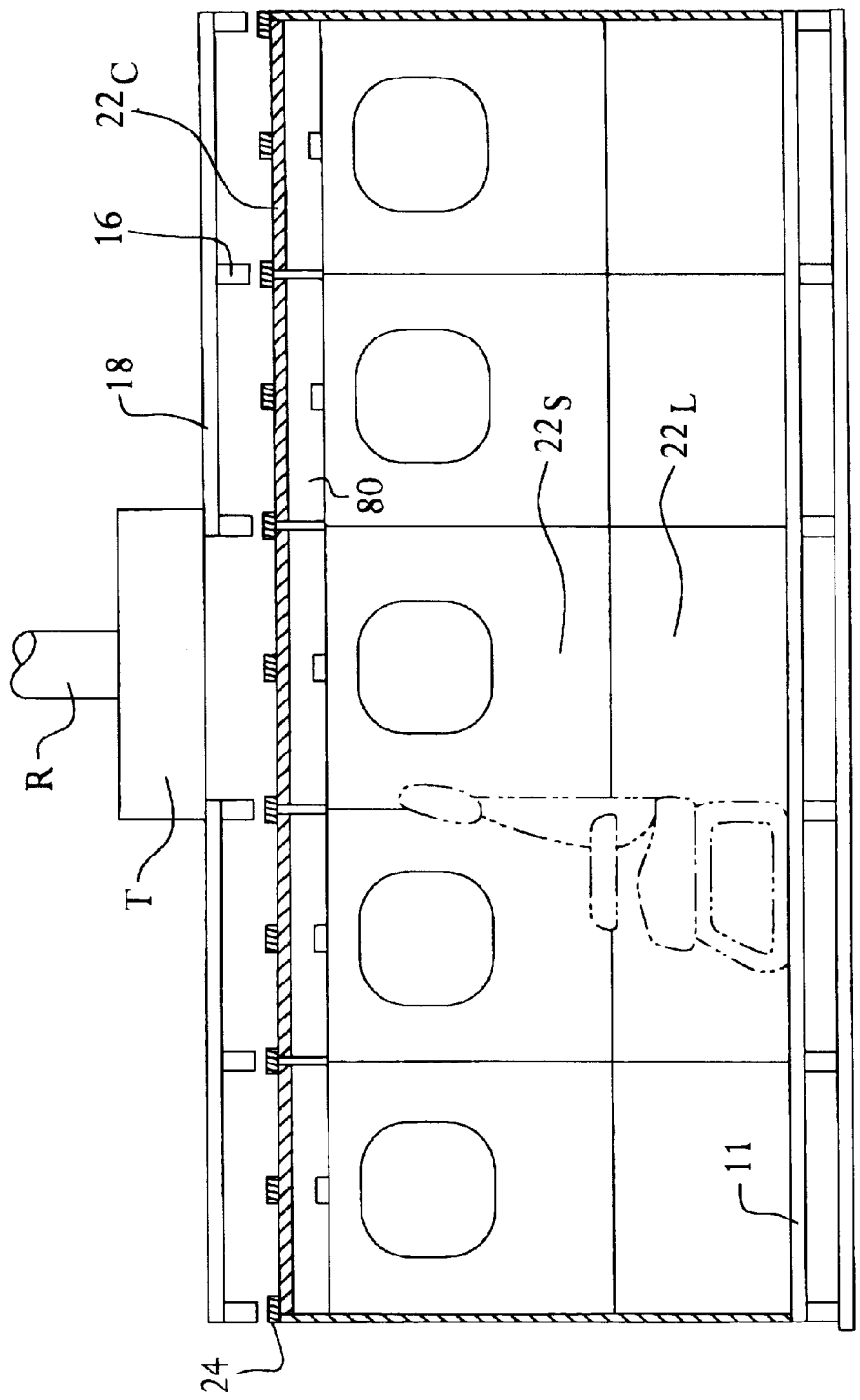
FIG. 3 is a section view taken along lines 3—3 in FIG. 1 illustrating the cabin interior assembly according to the present invention.
Figure 4:
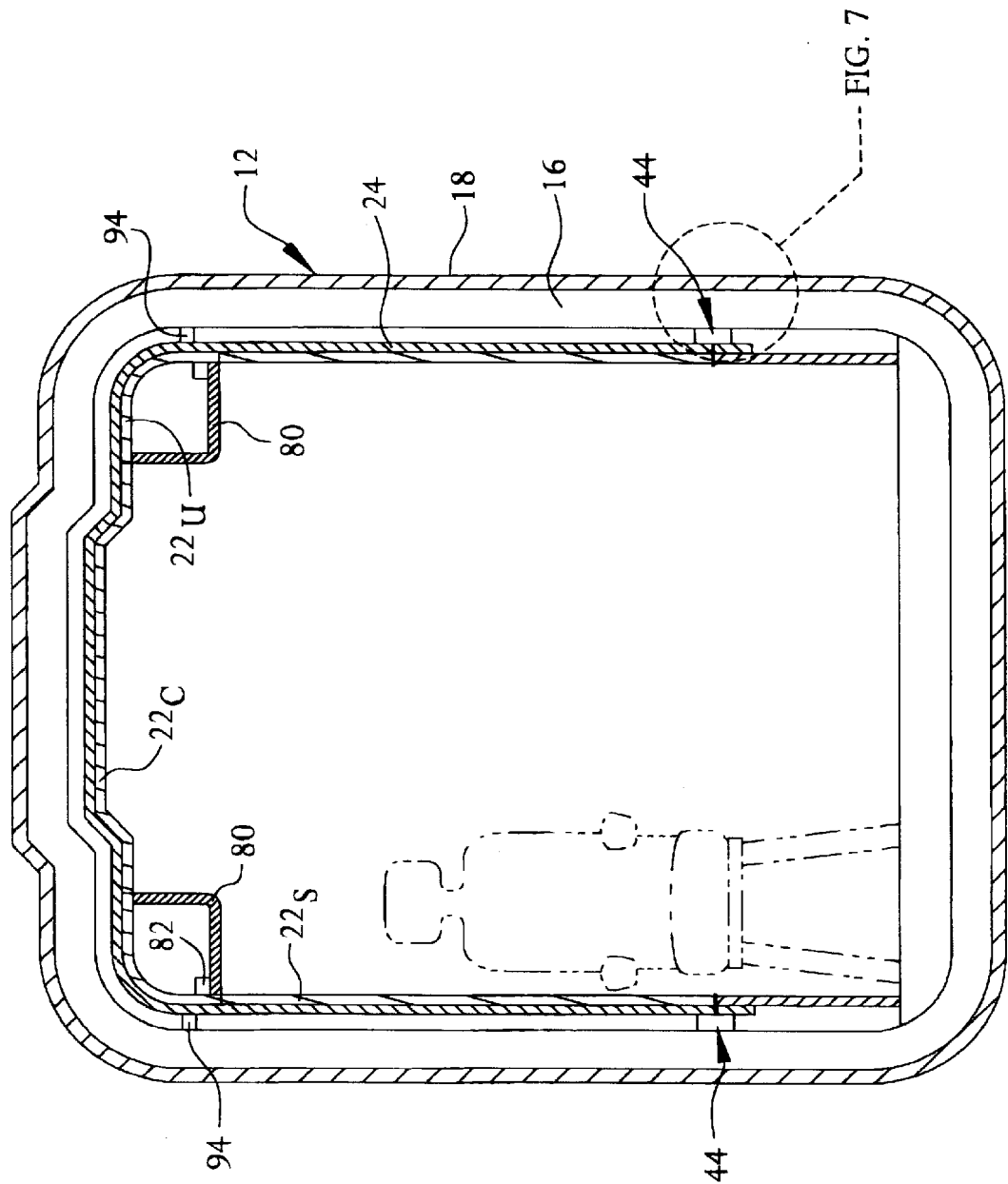
FIG. 4 is a section view taken along lines 4—4 in FIG. 1 illustrating a cross-section of the cabin interior assembly according to the present invention.

As shown in FIGS. 3 and 4, the shell structure 14 is preferably designed with a height and width that is less than the interior height and width of the airframe structure 12. The spacing between the airframe structure 12 and the cabin interior assembly 14 is designed to minimize the transmission of acoustical vibrations from the airframe structure 12 into the cabin interior. Preferably, there is at least 1.5 inches of space between the interior of the airframe structure 12 and the ceiling portion of the cabin interior assembly 14, and at least 0.5 inches of spacing between the interior of the airframe structure 12 and the side portions of the cabin interior assembly 14. This spacing provides a buffer between the vibrating airframe structure 12 and the cabin interior assembly 14. Noise reduction can be further augmented by the inclusion of acoustically absorptive batting (not shown) in the spacing between the airframe structure 12 and the cabin interior assembly 14.

The shell structure 20 is attached to the airframe structure 12 at lower mounting points located at or near the lower ends of the bell frames 24. The mounting points are generally identified by the numeral 44. These mounting points will be discussed in more detail herein below. It is important to note that the preferred mounting location for the shell structure 20 is at a relatively distant location from the helicopter's vibration source, e.g., transmission or rotor system R, to minimize the transfer of vibrations into the cabin interior. Conventional interior structures mount interior panels directly to the aircraft structure and, in some cases, directly to the beams and frames which provide the primary support for a vibrating components. As such, vibrations are transmitted into the cabin interior very close to where these vibrations are generated and, thus, these vibrational energies are nearly at their highest levels. The present invention reduces vibrational transmittance by attaching the shell structure 20 to the airframe structure 12 at locations that are spaced apart from the vibrational generating components. Accordingly, much of the vibrations which are generated by the vibrating components are attenuated by the distance along the airframe structure before having an opportunity to transmit into the shell structure 20 and, from there, into the interior cabin structure 14. Thus, the distance the noise vibrational energy must travel in the present invention is substantially increased over the distance for a conventional system.

As mentioned above, there are a plurality of panels 22 mounted to the shell structure 20. Adjacent panels 22 are mounted to the shell structure in a butt joint so as to make it possible to remove any individual panel without having to remove an adjacent panel. Accordingly, when a panel 22 is damaged or needs to be repaired or replaced, it is easy to disassemble the panel 22 from the aircraft interior 14. The shell structure 20 overlaps the back edges of the panels 22 so as to provide a tight seal for preventing noise transmission into the cabin from the exterior of the aircraft without removal of adjacent panels. The panels 22 are preferably made from paper honeycomb core with fiber resin reinforced skin material with a thickness of approximately ⅜ inches. In one embodiment. the panel includes a ⅜ inch thick honeycomb core with one ply of fiberglass 7781 fabric (0.012 inch thick) disposed on top and bottom. This composite laminate would be suitable for the side panels. The panels that are mounted on the ceiling and near the upper corners preferably include a ⅜ inch thick honeycomb core with one ply of fiberglass 120 fabric (0.006 inch thick) on the bottom and two plies on the top. Interior panel constructions are well known to those skilled in the art.

FIGS. 5 and 6 illustrate one preferred method for attaching the longitudinal support members 26. The attachment includes a first bracket member 28 attached to one end of the longitudinal support member 26 and a second bracket 30 attached to the other end of the longitudinal support member 26. In the illustrated embodiment, the first bracket 28 is preferably bonded or similarly attached to the longitudinal support member 26. Alternatively, instead of bonding the first bracket 26 to the longitudinal support member 26, the first bracket 28 can be fastened to the longitudinal support member 26 using conventional screws. The first bracket 28 includes a flange 32 which extends outward from the longitudinal support member 26. Fasteners 34 are inserted through holes (not shown) in the flange 32 to attach the first bracket 28 to the bell frame 24.

The second bracket 30 preferably includes a channel portion 36 which surrounds three sides of the longitudinal support member 26. Fasteners 38, such as screws, attached the second bracket 30 to the longitudinal support member 26. Other methods for attaching the second bracket 30 to the longitudinal support member 26 are also contemplated, such as bonding or snap-together type joints. The second bracket 30 includes a flange 40 which extends outward from the longitudinal support member 26. Fasteners 36 are inserted through holes (not shown) in the flange 40 to attach the second bracket 30 to the bell frame 24.

The fasteners used to attach the longitudinal support member 26 are all preferably removable to facilitate disassembly of the shell structure 20 if needed.

Any conventional removable fastener can be used in the present invention for attaching the first and second brackets 28, 30, such as a 10–32 NF screw type fastener. The first and second brackets 28, 30 are preferably made from aluminum material with a thickness of ⅛ inch.

Figure 7:
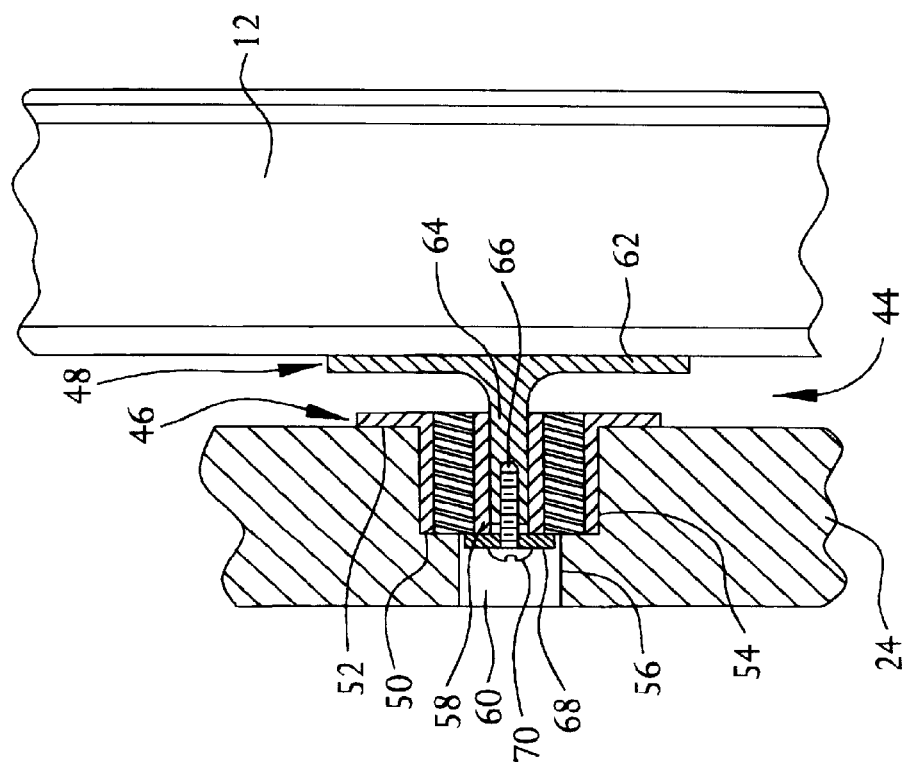
FIG. 7 is a detail view of the isolator from FIG. 4 which attaches the shell structure to the airframe structure.

The attachment of the bell frames 24 to the airframe structure 12 is provided by an isolator 44 and is shown in more detail in FIG. 7. The isolator 44 includes a cabin isolator component 46 and a frame isolator component 48. In one preferred embodiment, the cabin isolator component 46 includes an annular cuff 50 and a cuff flange 52. The cuff 50 is disposed within a recess 54 formed in the lower end of the bell frame 24. The recess 54 preferably extends at least part way through the bell frame thickness as shown. The cuff flange 52 is planar in shape and is disposed against an outward facing surface of the bell frame 24 when the cuff 50 is disposed within the recess 54. The cuff flange 52 is mounted to the bell frame 24 through any conventional means known to those skilled in the art, such as bonding or fastening. The cuff 50 and cuff flange 52 are preferable made from aluminum or steel material. The cuff 50 preferably has an outer diameter of about 1 inch and includes an inner cavity. Although the preferred cuff is annular in shape, other shapes can be substituted for this preferred shape.

Disposed within the inner cavity of the cuff 50 is an elastomeric member 56. The elastomeric member is preferably a rubber like material with a hardness of between 30 to 98 IRHD (international rubber hardness), which is approximately equal to the Shore hardness durometer A. While an elastomeric member 56 is used in the preferred embodiment, other vibration absorbing materials can be readily substituted therefor without departing from the scope of the invention. The elastomeric member 56 is preferably formed as an annular ring.

A mounting member 58, preferably cylindrical in shape, is disposed within and bonded to or otherwise engaged with the inside diameter of the elastomeric member 56. The mounting member 58 is preferably made from aluminum material. The cuff 50, elastomeric member 56 and mounting member 58 are all preferably mounted concentric with one another. One preferred isolator is a 92500-02819-041 isolator sold by Paulstra Vibrochoc, Levallois-Perret Cedex, France.

A hole 60 is formed through the back of the bell frame 24 and is in communication with the recess 54 for gaining access to the mounting member 58 as will become apparent hereinafter. Alternatively, the recess 54 can extend completely though the bell frame 24 thickness, eliminating the need for a separate hole 60.

The frame isolator component 48 includes a frame flange 62 which is disposed against the inner facing surface of a frame or beam of the airframe structure. The frame flange 62 is attached to the frame or beam by any conventional means known to those skilled in the art, such as bonding or fastening. A shaft 64 extends laterally out from the frame flange 62 and has an outer dimension sized to fit within a hole formed in the mounting member 58. The distal end of the shaft 64 includes a threaded aperture 66.

In order to attach the bell frame 24 to the airframe structure 12. the shaft 64 is slidingly inserted into the mounting member 58. A washer 68 is preferably inserted through the hole 60 and rests against the mounting cylinder 58. A bolt or similar attachment device 70 is threadingly engaged with the threaded aperture 66 in the shaft 64. The bolt 70 and washer 68 interconnect the shaft 64 on the frame isolator component 48 with the mounting member 58 on the cabin isolator component 46. This interconnection locks the shaft 64 to the cabin isolator component 46. As such, when the airframe structure 12 vibrates, shaft 64 vibrates within the cabin isolator component 46. The elastomeric member 56 absorbs most of the vibrations transmitted by the shaft 64. It is contemplated that the elastomeric member 56 would have a durometer tuned to reduce a predetermined vibratory frequency.

Referring back to FIG. 5, the preferred arrangement for mounting the panels 22 to the shell structure 20 is shown. As discussed above, the panels 22 are attached to the shell structure 20 with their lateral edges forming a butt joint 98. By mounting the panels 22 to the shell structure 20 via butt joints 98 it is possible to quickly and easily remove an individual panel from the cabin without having to remove any adjacent panels 22. The butt joint 98 spacing between adjacent panels 22 is preferably kept as small as possible. However, some spacing is necessary to account for manufacturing tolerances and structural deflections.

Apertures are formed through the panels 22 where the panels 22 overlie the bell frames 24 and the longitudinal support members 26. Quarter-turn fasteners 72 are inserted into the apertures and attach to threaded inserts which are potted into the bell frames 24 and the longitudinal support members 26. The attachment of the quarter turn fasteners with the threaded inserts attached the panels to the shell structure 20. Since the shell structure 20 functions as the primary framing component for the cabin interior assembly 14, fine threaded fasteners are not needed to attach the panels 22. Instead, quick release fasteners 72, such as quarter-turn fasteners, can be used to facilitate removal and replacement of interior panels 22. Any type of conventional quick-release fastener 72 would be suitable for use in the present invention. To prevent the fasteners 72 from protruding into the cabin interior, the apertures are preferably countersunk.

Figure 10:
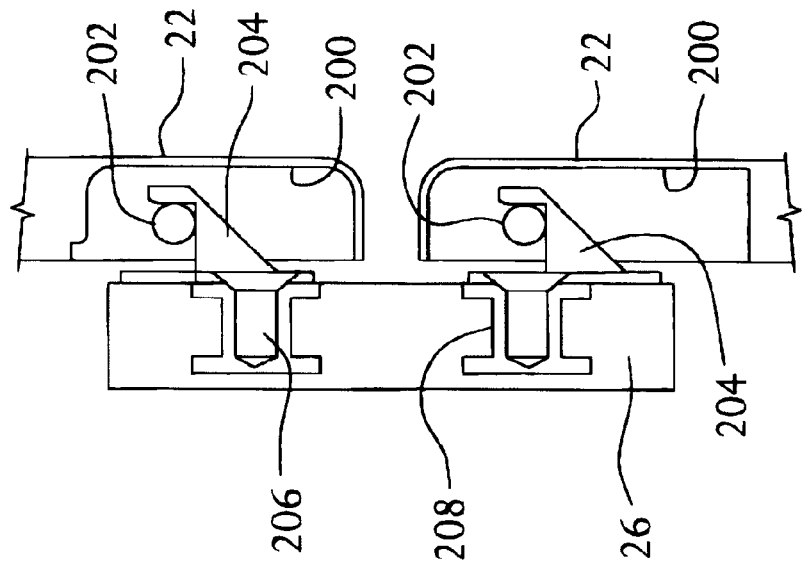
FIG. 10 is a detailed view taken along the lines 10—10 in FIG. 1 illustrating the preferred attachment of the panels to the lower longitudinal support member.

An alternate mounting arrangement is shown in FIG. 10. In this embodiment, panels 22 and 22 are attached to the longitudinal support member 26 with a pin and clip fitting. This provides improved removability of the panels 22 and 22. As shown, an insert 200 is attached to a recess formed in the panel 22. The insert includes a pin 202. Mounting clips 204 are attached to the inboard side of the longitudinal support member 26. The mounting clips can be attached by any conventional means, such as screws 206 which engage with potted inserts 208 in the longitudinal support member 26. The panels 22 are attached to the longitudinal support member 26 by engaging the pins 202 with the clips 204 as shown.

In one preferred embodiment of the invention, there are approximately four fasteners 72 used to attach a panel 22 to the bell frames 24 and the longitudinal support members 26.

Figure 8:
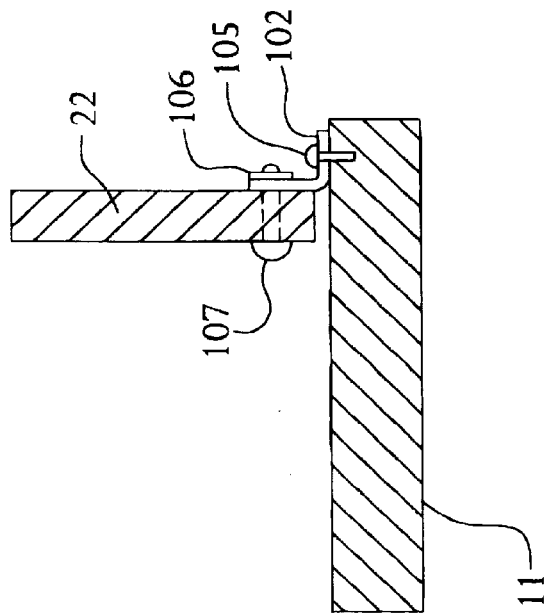
FIG. 8 is a section view taken along lines 8—8 in FIG. 1 illustrating a tongue and slot used to attach a lower panel to the cabin floor.

As shown in FIG. 4, the present invention includes a plurality of panels 22 spaced about the circumference of the cabin interior. In the illustrated embodiment shown, the cabin interior assembly 14 includes lower panels $22_L$, side panels $22_S$, upper panels $22_U$ and ceiling panels $12_C$. The side panels $12_S$, upper panels $22_U$ and ceiling panels $22_C$ are all preferably attached to the shell structure as described above. The bottom edge of the lower panels $22_L$, however is attached to the aircraft cabin floor 11 using a bracket that includes an elastomeric mount and a threaded insert. Referring to FIG. 8, a plurality of brackets 102 are affixed to the floor 11 with screw fasteners 105. Each bracket 102 has an elastomeric isolator 106 with a threaded insert attached to it. A hole is located in the lower edge of panel 22 through which a screw 107 is inserted and threaded into the isolator 106.

The interior cabin structure 14 may also include one or more overhead bins 80 for containing air vent ducting and/or personal items of the occupants. The overhead bins 80 are preferably hinged to the cabin interior 14. More particularly, the overhead bins 80 include hinges 82 which attach through the panels 22 into the upper longitudinal support members 26 or the bell frames 24. Preferably quarter-turn fasteners are used to attach the hinges 82 to the cabin interior assembly 14.

While the illustrated embodiment shows longitudinal support members 26 extending along the side, corner and ceiling of the cabin interior assembly 14, it is also contemplated that more or less support members may be used to form the shell structure 20 depending on the cabin design and stiffness requirements.

The present invention elleviates many of the problems discussed above with respect to conventional cabin interiors by providing a cabin interior assembly which is rigid yet very easy to maintain, reducing the down time of the aircraft.

Figure 9:
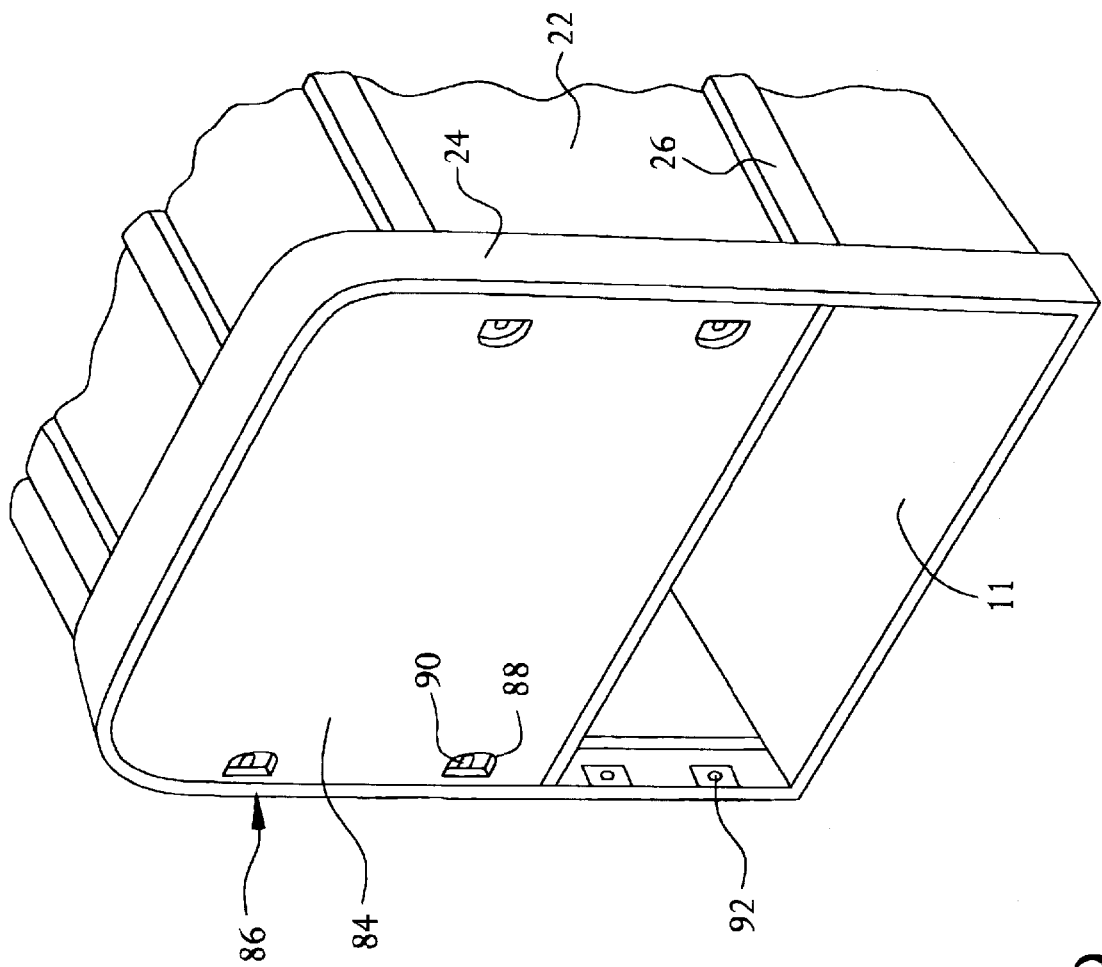
FIG. 9 is a partial isometric view of the cabin interior assembly with a removable bulkhead.

In another embodiment of the invention, removable interior bulkheads are mounted to the shell structure 20. Referring to FIG. 9, an upper bulkhead 84 is shown mounted to a bell frame 24. To illustrate some of the features of the invention, the lower bulkhead is not shown, but is substantially the same as the upper bulkhead. The bulkhead 84 includes a plurality of removable fasteners 86 for removably attaching the bulkhead to the bell frame 24. In one embodiment. the attachments are locking pins which can be easily disengaged. One suitable locking pin is model PN BL C4 LA 13S, sold by Avibank Manufacturing Inc., Burbank Calif. The bulkhead 84 includes inserts 88 bonded into the bulkhead 84 near its lateral edges. The inserts 88 include holes (not shown) which allow the locking pins 90 to engage with a detents 92 on the bell frame 24. The detents 92 can be either a holes drilled into the frame 24 or, more preferably, depressions that are formed in inserts bonded or otherwise attached to the bell frame 24. There are preferably four locking pins 90 for attaching the bulkheads 84 to the bell frame 24.

Hence, by modifying the bell frames 24 to include detents 92, bulkheads 84 can be easily rearranged throughout the cabin depending on the cabin arrangement desired. While the embodiment described above uses locking pins for attaching the bulkheads, other suitable removable fasteners can be substituted for the locking pins, such as latches.

As discussed above, the present invention provides a novel cabin interior assembly which reduces the transmission of vibratory noises into the cabin interior. By mounting the bell frames 24 to the airframe structure 12 away from the primary vibration generating components, the present invention allows the airframe to attenuate the vibrations before they reach the interior mounting points.

For Sikorsky Aircraft Corporation's S-92 commercial aircraft, it is anticipated that the isolators 44 will be located at about aircraft waterline 214. This is approximately 46 inches below the location of the main beams 17 that support the transmission.

It is also contemplated that not all the bell frames 24 will include a mounting point. Instead, stiffness requirements will determine which bell frames 24 are attached to the airframe.

Referring to FIG. 4, in order to laterally support the shell structure 20, bumpers 94 are preferably mounted to the airframe structure 12 adjacent to the sides of at least some of the bell frames 24. The bumpers 94 include a rubber stop that is disposed between the airframe structure 12 and the bell frame 24. The rubber stop prevents excessive side-to-side motion of the interior 14 during flight and the transmission of vibrations from the airframe structure 12 into the bell frame 24.

As discussed above, on a Sikorsky Aircraft S-76® aircraft it takes two maintenance personnel one shift to completely remove a conventional cabin interior. The novel cabin interior assembly 14 according to the present invention can be removed by two maintenance personnel in approximately one hour in the larger cabin of the Sikorsky Aircraft S-92™ with an individual panel 22 removable by one man in less than two minutes, reducing aircraft downtime significantly.

Additionally, the cabin interior assembly 14 according to the present invention weighs approximately 300–350 pounds as compared with a conventional interior system which can weigh upwards of 450 pounds.

More importantly, the cabin interior assembly 14 according to the present invention can reduce noise in a cabin interior due to vibrations by as much as 90 percent.

Although the invention has been described and illustrated with respect to the exemplary embodiments thereof, it should be understood by those skilled in the art that the foregoing and various other changes, omissions and additions may be made therein and thereto, without departing from the spirit and scope of the present invention.

What is claimed is:

1. A cabin interior assembly for an aircraft having a primary airframe structure which supports vibrating components at substantially the top of the aircraft structure, the cabin interior assembly comprising:

a shell structure located within the airframe structure, the shell structure including a plurality of axially spaced bell frames, each bell frames being unitary and extending from one side of the cabin interior assembly, across the ceiling and down to the other side of the cabin interior assembly, each pair of adjacent bell frames having at least two longitudinal support members attached to and extending between the bell frames;

a plurality of panels mounted to the shell structure, the edges of adjacent panels forming a butt joint so that each panel is independently removable from the shell structure; and a plurality of isolators adapted to be disposed between the shell structure and the airframe structure, each isolator having a cabin isolator component mounted to a lower end of a bell frame so as to be distantly spaced from the vibrating component when the shell structure is mounted to the airframe structure, the cabin isolator component adapted to mate with a frame isolator component mounted on the airframe structure, the isolator operative for attaching the shell structure to the airframe structure and for reducing vibratory transmission from the airframe structure to the shell structure.

2. A cabin interior assembly according to claim 1 wherein the bell frames are made from a graphite reinforced resin matrix material disposed on a core.

3. A cabin interior assembly according to claim 1 wherein the panels attach to the bell frames and the longitudinal support members.

4. A cabin interior assembly according to claim 3 wherein the panels are attached using quick release fasteners.

5. A cabin interior assembly according to claim 1 wherein there are at least four longitudinal support members located between adjacent bell frames, two of the longitudinal support members are attached near the lower ends of the bell frames, and the other two longitudinal support members are attached at the upper corners of the bell frames.

6. A cabin interior assembly according to claim 1 wherein the longitudinal support beams are attached to the bell frames via first and second brackets, and wherein at least one bracket is attached to the longitudinal support member.

7. A cabin interior assembly according to claim 1 wherein there are a plurality of panels mounted between adjacent bell frames, the lower most panels adapted to engage with the cabin floor.

8. A cabin interior assembly according to claim 1 wherein the bell frames have an inner side facing into the cabin and forward and aft sides, and wherein each longitudinal support member has an inner side. each longitudinal support member attaching to the forward side of one bell frame and the aft side of an adjacent bell frame so that the inner side of the longitudinal member is in substantially the same plane as the inner side of the bell frame thereby defining a substantially flush mounting surface for a panel.

9. A cabin interior assembly according to claim 8 wherein the inner facing sides of the bell frames and longitudinal support members form an acoustical seal with the panel to prevent or reduce acoustic leakage.

10. A cabin interior assembly according to claim 1 wherein each bell frame is approximately ¾ inches thick and approximately 2 inches wide, the bell frame having a foam core surrounded by carbon fiber plies.

11. A cabin interior assembly according to claim 1 wherein each panel mounts to at least two bell frames and at least one longitudinal support member.

12. A cabin interior assembly according to claim 1 wherein each longitudinal support member includes a honeycomb core with top and bottom fiberglass plies.

13. A cabin interior assembly according to claim 1 wherein each cabin isolator component includes an annular metallic cuff mounted within a recess in a bell frame and facing outwardly from the bell frame away from the cabin, the recess extending through the bell frame, the cabin isolator component also including an inner metallic mounting ring and an elastomer material disposed between the inner mounting ring and the cuff the inner mounting ring adapted to receive an inwardly protruding shaft on the frame isolator component.

14. A helicopter aircraft comprising:

a primary airframe structure, the airframe structure defining a cabin section with beams extending at least partially along the top, the beams supporting a helicopter transmission and rotor system;

a floor located within the cabin section and attaching to the airframe structure;

a shell structure located within the cabin section and spaced inward from the airframe structure and above the cabin floor, the shell structure including
      a plurality of axially spaced bell frames, each bell frames having a ceiling portion with depending sides portions;
      at least four longitudinal support members attached to and extending between adjacent bell frames;

a plurality of panels mounted to the shell structure, the edges of adjacent panels forming a butt joint so that each panel is independently removable from the shell structure; and a plurality of isolators disposed between the shell structure and the airframe structure, each isolator having an first component mounted to a lower end of a bell frame, and a second component mounted on the airframe structure, the second component adapted to mate with the first component, the isolator operative for attaching the shell structure to the airframe structure and for attenuating vibratory transmissions from the airframe structure to the bell frame, the isolators being located distant from the helicopter transmission and rotor system so as to minimize transmission of vibration and noise.

15. A helicopter aircraft according to claim 14 wherein the bell frames are made from graphite reinforced resin matrix material disposed on a core.

16. A helicopter aircraft according to claim 14 wherein the panels attach to the bell frames and the longitudinal support members.

17. A helicopter aircraft according to claim 16 wherein the panels are attached using quick release fasteners.

18. A helicopter aircraft according to claim 14 wherein two of the longitudinal support members are attached to the lower ends of the bell frames, and the other longitudinal support members are attached at the upper corners of the bell frames.

19. A helicopter aircraft according to claim 14 wherein each longitudinal support member is attached to the bell frames with first and second brackets, and wherein at least one bracket is attached to the longitudinal support member.

20. A helicopter aircraft according to claim 14 wherein there are a plurality of panels mounted between adjacent bell frames, the lowermost panels adapted to engage the cabin floor.

21. A helicopter aircraft according to claim 14 further comprising a bulkhead portion removably attached to the bell frames.

22. A helicopter aircraft according to claim 14 wherein the bell frames have an inner side facing into the cabin and forward and aft sides, and wherein each longitudinal support member has an inner side, each longitudinal support member attaching to the forward side of one bell frame and the aft side of an adjacent bell frame so that the inner side of the longitudinal member is in substantially the same plane as the inner side of the bell frame thereby defining a substantially flush mounting surface for a panel.

23. A cabin interior assembly according to claim 22 wherein the inner facing sides of the bell frames and longitudinal support members form an acoustical seal with the panel to prevent or reduce acoustic leakage.

24. A helicopter aircraft according to claim 14 wherein each cabin isolator component includes an annular metallic cuff mounted within a recess in a bell frame and facing outwardly from the bell frame away from the cabin, the recess extending through the bell frame, the cabin isolator component also including an inner metallic mounting ring and an elastomer material disposed between the inner mounting ring and the cuff, the inner mounting ring adapted to receive an inwardly protruding shaft on the frame isolator component.

25. A cabin interior assembly for an aircraft having a primary airframe structure which supports vibrating components located near the top of the aircraft structure, the cabin interior assembly comprising:
   a shell structure located within and spaced apart from the airframe structure, the shell structure providing a rigid structural space frame, the shell structure including
      a plurality of axially spaced bell frames, each bell frames having integral ceiling and side portions forming an inverted substantially U-shaped frame, and
      a plurality of longitudinal support members extending between and attaching to adjacent bell frames;
   a plurality of panels removably mounted to the shell structure, the edges of adjacent panels forming a butt joint so that each panel is independently removable from the shell structure; and
   a plurality of isolators disposed between the shell structure and the airframe structure, each isolator having a first component mounted to a lower end of a bell frame, and a second component mounted on the airframe structure, the first and second component adapted to mate with one another for mounting the shell structure to the airframe structure, the isolator operative for reducing vibratory transmission from the airframe structure to the shell structure, the isolators being located distant from the vibrating components so as to minimize transmission of vibration and noise.

26. A helicopter aircraft according to claim 25 wherein the bell frames are made from graphite reinforced resin matrix material disposed about a core and the longitudinal support members are made from a honeycomb sandwich structure.

27. A helicopter aircraft according to claim 25 wherein the panels are attached using quick-release type screw fasteners.

28. A helicopter aircraft according to claim 25 wherein there are at least longitudinal support members extending between the lower ends of adjacent bell frames and between the upper corners of adjacent bell frames.

29. A helicopter aircraft according to claim 25 wherein each longitudinal support member is attached to the bell frames with first and second brackets, and wherein at least one bracket is attached to the longitudinal support member.

30. A helicopter aircraft according to claim 25 wherein there are a plurality of panels mounted between adjacent bell frames, the lowermost panels attaching to the cabin floor.

31. A cabin interior assembly according to claim 25 wherein the bell frames have an inner side facing into the cabin and forward and aft sides, and wherein each longitudinal support member has an inner side, each longitudinal support member attaching to the forward side of one bell frame and the aft side of an adjacent bell frame so that the inner side of the longitudinal member is in substantially the same plane as the inner side of the bell frame thereby defining a substantially flush mounting surface for a panel.

32. A cabin interior assembly according to claim 31 wherein the inner facing sides of the bell frames and longitudinal support members form an acoustical seal with the panel to prevent or reduce acoustic leakage.

33. A cabin interior assembly according to claim 31 wherein each cabin isolator component includes an annular metallic cuff mounted within a recess in a bell frame and facing outwardly from the bell frame away from the cabin, the recess extending through the bell frame, the cabin isolator component also including an inner metallic mounting ring and an elastomer material disposed between the inner mounting ring and the cuff, the inner mounting ring adapted to receive an inwardly protruding shaft on the frame isolator component.

* * * * *